Nov. 29, 1960  J. R. SHARPSTEEN, JR  2,962,426
ELECTROCHEMICAL METHOD FOR ANALYZING MATERIALS
Filed Sept. 9, 1958  2 Sheets-Sheet 1

INVENTOR
JAY RANDOLPH SHARPSTEEN, JR.
BY
ATTORNEY

Nov. 29, 1960    J. R. SHARPSTEEN, JR    2,962,426
ELECTROCHEMICAL METHOD FOR ANALYZING MATERIALS
Filed Sept. 9, 1958    2 Sheets-Sheet 2
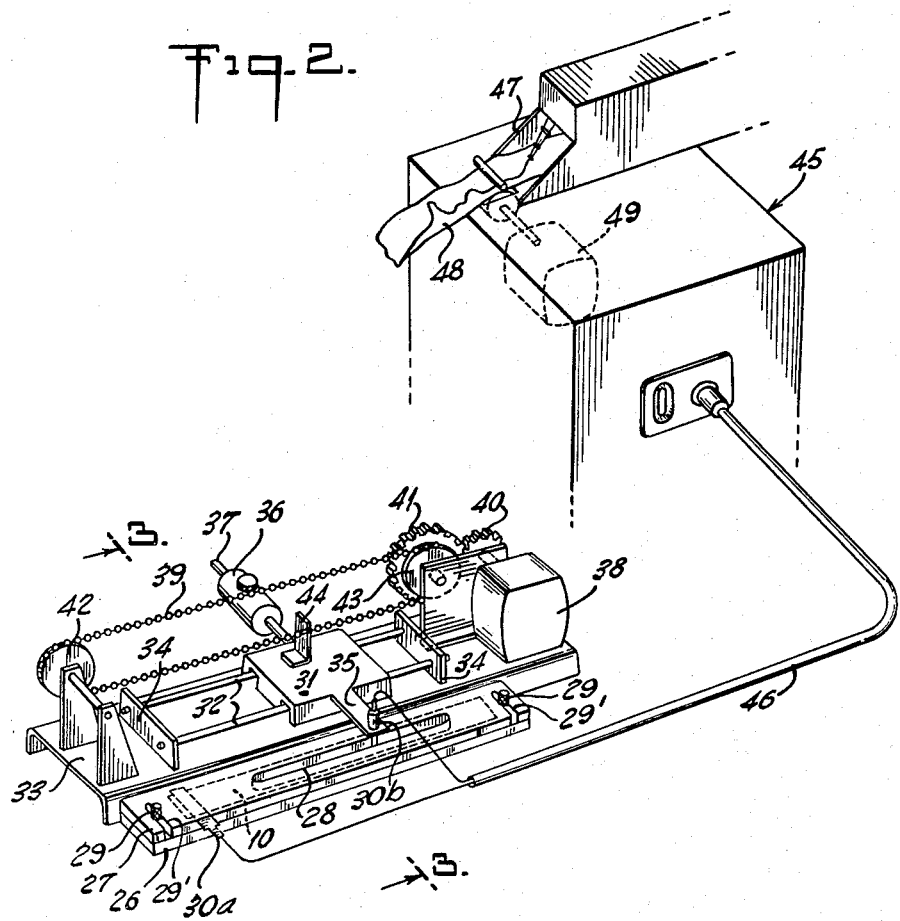
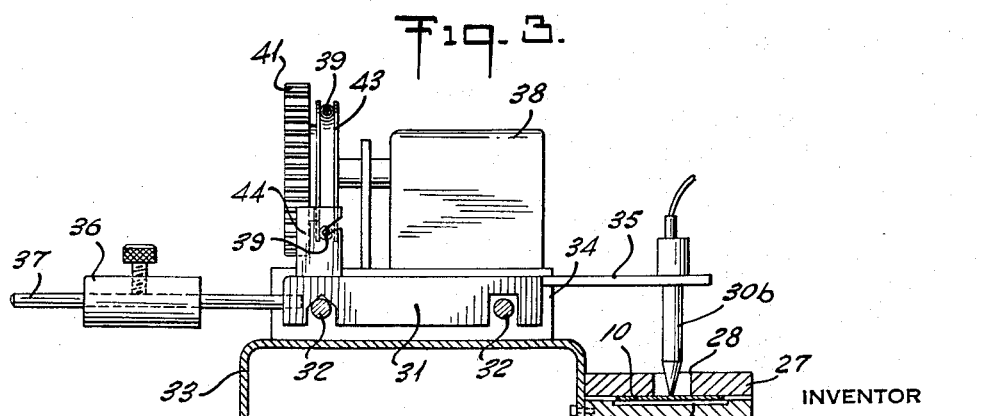
INVENTOR
JAY RANDOLPH SHARPSTEEN Jr
BY
ATTORNEY United States Patent Office 2,962,426
Patented Nov. 29, 1960

2,962,426

ELECTROCHEMICAL METHOD FOR ANALYZING MATERIALS

Jay Randolph Sharpsteen, Jr., Monrovia, Calif., assignor to Cambridge Instrument Company, Inc., New York, N.Y., a corporation of New York Filed Sept. 9, 1958, Ser. No. 760,011

17 Claims. (Cl. 204—1)

This invention relates to electrochemical analysis of materials and more specifically to a novel and improved method and apparatus for analyzing separated constituents of materials as produced, for instance, by chromotography which includes electrophoresis and other processes.

Many processes for the separation of materials, including chromatographic procedures, are well known and various methods of analyses have been employed to afford qualitative and quantitative measurements. Chromatographic procedures have been found very useful for the separation of materials, as they require relatively small amounts of the material to be tested and rely on different characteristics of the particles forming the material to effect their separation into groups. These procedures, however, while effective for the separation of materials, require elaborate and expensive equipment and complicated procedures for analyzing the results, all of which involve optical systems of one form or another having limited resolution and which require considerable time for preparation of the separated materials by treatment with suitable dyes and conducting the desired measurements. Because of the fact that the material separation is produced by the migration of particles on a suitable carrier, and since the particles can and do continue to migrate after conclusion of the separating process, the time required, often in excess of four hours, to treat and scan the material will introduce measurement errors in addition to those encountered by reason of the inherent limitations of the optical equipment itself.

Accordingly it is one object of the invention to provide a novel and improved method and apparatus for providing accurate qualitative and quantitative measurements of separated materials on a carrier medium that is characterized by its simplicity, ease of operation, rapidity and greatly improved resolution. Moreover, since the measurements can be made quickly and accurately, they can be readily duplicated in order to confirm the results.

While it is evident from the foregoing discussion that this invention may be used for analyzing separated materials on a supporting media, it will be described in connection with the analysis of materials separated by electrophoresis.

As pointed out above, electrophoresis involves the migration of charged particles in solution. Virtually all particles in solution, including colloids such as proteins, carry an electric charge and will migrate under the influence of an electric field. The direction and rate of such migration are functions of the magnitude of the field, the charge on the particles and certain other factors, including particle size, viscosity and the like.

Prior known systems for electrophoretic analysis of materials have used either a liquid cell or other media to support the materials during the separation process and the analysis is accomplished by optical means. In the cell method, a vessel containing a liquid and the material to be separated is provided with suitable electrodes for the passage of an electric current through the cell. Detection of the mobility and grouping of like particles is accomplished by optical means.

Another method of separating material by electrophoresis involves the use of absorbent paper saturated with a buffer solution of known pH. By applying a sample of the material to be tested to the paper and applying an appropriate potential, the particles will migrate from the point of application with the particles of different substances migrating at different rates of speed. After the material is separated an appropriate dye is applied to the paper to afford a visual indication of the relative densities of the separated constituents. In the case of proteins, they are preferably fixed before application of the dye. Thereupon, the paper is generally dried and the different densities of the dye in the various portions of the paper are measured optically, either by suitable instruments such as refractometers, densitometers, colorimeters or similar equipment.

The preparation of a paper record carrying the separated material to enable the performance of optical measurements of any type requires, as the first step, drying of the record, since electrophoretic separation is carried on with the paper in a saturated condition. The dye is then applied, cleaned and the paper again dried before the measurement can be made. The entire procedure usually requires in excess of four hours during which dispersal of the particle groupings can take place and even with the most precise methods it is exceedingly difficult—if not impossible—to achieve a degree of control of the several steps sufficiently accurate to insure reproducibility of the results.

The present invention overcomes a number of the disadvantages obtaining with prior procedures and affords a novel and improved method and apparatus for electrochemically analyzing separated materials on a supporting media that avoids optical procedures and affords materially improved resolution and accuracy.

Another object of the invention resides in a novel and improved electro-chemical method of scanning supporting media on which materials have been separated by electrophoresis to produce a permanent record indicating the relative positions and amounts of the constituents of a liquid or other material being tested.

A still further object of the invention resides in a novel and improved method and apparatus for scanning electrophoretic records.

The above and other objects and advantages of the invention reside in a novel and improved method and apparatus for scanning electrophoretic records.

The above and other objects and advantages of the invention will become more apparent from the following description and accompanying drawings forming part of this application.

In the drawings:

Figure 2 is a diagrammatic view in perspective of apparatus in accordance with the invention for scanning a paper strip having a separated material thereon;

Figure 3 is a cross sectional view of Figure 2 taken along the line 3—3 thereof;

As pointed out above, paper, usually in strip form, and carrying materials separated by electrophoresis, were heretofore dried, dyed, cleaned, re-dried and then scanned by optical means to determine the various constituents of such materials. This process is particularly useful, among other things, for the analysis of blood to determine the quantity of albumin and other constituents and constitutes an important diagnostic aid in the detection and treatment of disease. It is therefore essential that the results be readily reproducible with great precision in order to insure the highest degree of accuracy.

Figure 4:
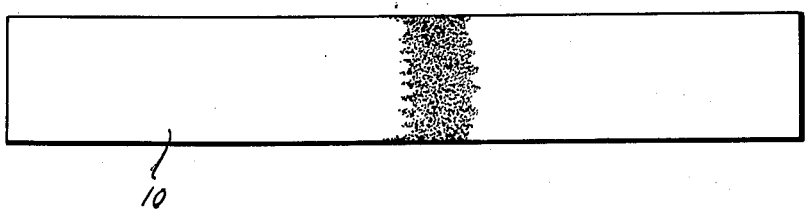
Figure 4 illustrates a conventionally prepared electrophoretic record.
Figure 5:
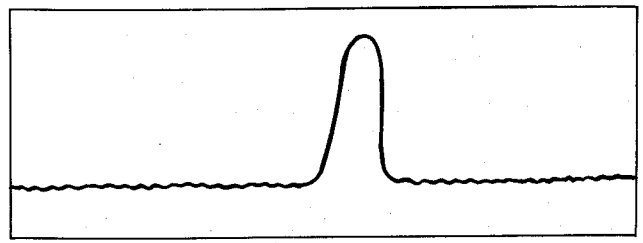
Figure 5 is a graph produced by scanning the record of Figure 4 prior to application of the dye.

It has been found that materials on carrier media and separated by electrophoresis or other processes can be analyzed without utilizing the dyeing and drying process. This end may be attained by connecting one electrode of a voltage responsive indicator or recorder to one end of a carrier moistened with a conductive solution and moving a second electrode of the indicator along the surface of the carrier and in contact with the separated material. The detected voltage variations as measured by the indicator will vary in accordance with the density of the groups of particles separated from the material under test. For purposes of comparison, Figure 5 shows a voltage graph made in accordance with the invention, while Figure 4 shows the same record dyed in the conventional manner. The increased resolution in the graph of Figure 5 is indicative of improved precision and accuracy. Moreover, since the record or graph of Figure 5 can be made within minutes after a separation process is completed, little, if any migration or dispersal of the grouped particles will take place before completion of the scanning operation. More specifically, and for purposes of simplicity, the records illustrated in Figures 4 and 5 were made by applying albumin to an absorbent material and then effecting migration by electrophoresis. In Figure 4 the stippled portion illustrates the albumin particle group obtained by the electrophoretic process and dyed in a conventional manner so that an optical analysis can be effected. The voltage graph of Figure 5 was made in accordance with the invention by scanning the record before application of the dye. If desired, scanning can be accomplished after dyeing the record in the conventional manner. A careful analysis of the record of Figure 4 as compared with the voltage graph of Figure 5 clearly indicates a non-uniformity in the density of the albumin and possibly the presence of different types of particles that migrate at slightly different speeds when subjected to an electric field.

Although for illustrative purposes records of albumin alone have been shown and described, the numerous advantages of the invention are even more evident when used to analyze records wherein blood serum and other complex materials have been separated by chromatographic processes.

While the theory underlying the phenomena involved in this improved scanning system and method is not completely understood, it is evident from the graph of Figure 5, which was made by a voltage recorder, that a moistened material supported by a carrier actually produces measurable potentials between a selected fixed contact on the strip and a second movable contact.

Figure 1:
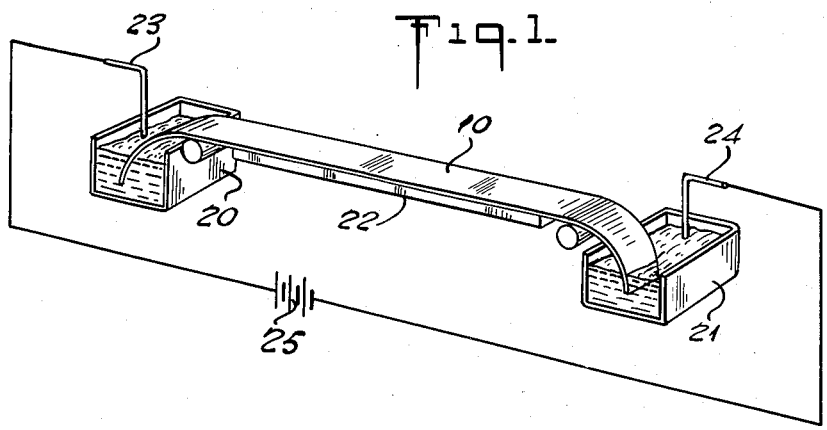
Figure 1 is a diagrammatic view in perspective of apparatus for separating materials on paper strips by electrophoresis.

Apparatus for separating a material by electrophoresis is shown diagrammatically in Figure 1. It includes a pair of spaced vessels 20 and 21 each containing a conductive or buffer solution of a predetermined pH as, for example, a buffer containing barbituric acid and sodium barbiturate and having an ionic strength of .075 and a pH of about 8.6. A sodium phosphate-saline buffer as well as numerous others may be used though the choice of the particular buffer generally depends on the nature and character of the material being tested. The paper strip or other carrier 10 is supported by a suitable plate 22 extending between the vessels 20 and 21 and the ends of the strip 10 are immersed in the buffer solutions contained in the vessels 20 and 21. The vessels are provided with electrodes 23 and 24 and a direct current potential from a battery 25 or other suitable supply is applied between the electrodes. With paper electrophoresis, the strip 10 is of an absorbent material and is maintained in the moistened state during the electrophoretic process. To achieve this end it is customary to enclose the apparatus within a chamber and maintain the air within the chamber in a solvent-saturated condition.

In usual procedures the material to be separated is generally applied in the vicinity of the center of the strip and voltage is maintained between the electrodes until the separating process has been completed, often for as long as 12 to 15 hours and even longer. The strip 10, being of an absorbent and porous material will permit the molecules or particles of the material to migrate along the strip under the influence of the current or electrical field produced by the power supply 25.

Inasmuch as the molecules of different materials carry different charges and are of different sizes, their rates of migration along the strip will differ. As a result, like particles will tend to form separated groups along the length of the strip as shown in the case of albumin in the dyed strip 10 in Figure 4. After the operation is completed, the strip 10 is immediately removed from the apparatus shown in Figure 1 and then scanned in accordance with the invention by means of apparatus diagrammatically illustrated in Figures 2 and 3.

The scanning apparatus includes a holder for the electrophoretic strip 10 which comprises a pair of overlying plates 26 and 27 with the plate 27 having an elongated slot 28 to expose that part of the record 10 to be scanned and minimize evaporation of the buffer. The two plates are secured together by suitable fastening means, such as thumb screws 29, and are preferably made of an insulating material inert to the buffer solution used on the strip 10. The upper plate includes elongated thumb screw slots 29' to permit lateral adjustment of the slot 28 relative to the strip 10. The lower plate also includes a strip receiving recess 26' to prevent application of pressure to the strip and attendant flow of liquid therefrom. The upper plate 27 may also include an electric contactor 30a that is pressed firmly against one end of the strip when the plates 26 and 27 are secured one to the other as illustrated.

The moving contactor, denoted by the numeral 30b, is supported by a carriage 31 slidably mounted on a pair of guide rails 32. The guide rails 32 are parallel to the slot 28 and may be fastened to the base 33 in any desired manner as by end plates 34. An arm 35 forming part of the carriage 31 supports the contactor 30b in insulating relationship to the carriage 31 and bracket 35. While a pair of guide rails 32 are used for the carriage 31, the carriage is actually pivotally supported by the guide rail farthest from the contactor 30b as viewed in Figure 3 and the pressure of the contactor 30b on the record 10 is controlled by a counterweight 36 adjustably supported on a rod 37 extending from the carriage 31. Translation of the carriage is accomplished by a motor 38 driving a chain 39 through a gear train including gears 40 and 41. The chain is supported by a pair of pulleys 42 and 43 and engages a bracket 44 on the carriage 31. In this way rotation of the motor will propel the carriage at a uniform rate of speed and thereby draw the movable contactor 30b uniformly over the surface of the strip 10.

The fixed contactor 30a and the movable contactor 30b are connected to the recording equipment generally denoted by the numeral 45 by means of an electric cable 46. The recorder 45 may include appropriate amplifying equipment for amplifying the signal produced between the contactors 30a and 30b and provides an output signal of sufficient magnitude to actuate the recording pen 47. The pen 47 bears on a strip 48 of paper or other material that is moved at a uniform rate of speed beneath the pen by a motor 49. Inasmuch as recorders such as the recorder 45 are well known in the art, a more detailed description is not deemed necessary. Other types of recorders may of course be used in place of the direct writing instrument illustrated.

It has been found that in separating materials by electrophoresis as well as other processes, the separated particles will tend to continue migration or dispersal after the potential on the strip has been removed. With the invention herein, however, the strip 10 can be removed from the apparatus shown in Figure 1 immediately upon completion of the process and placed on the scanning apparatus as shown in Figures 2 and 3. The scanning operation which requires but a few minutes to produce a permanent record as shown in Figure 5 can be accomplished before any appreciable particle dispersion or migration can take place. This insures the attainment of accurate and reproducible results not heretofore attainable. After the strip has been scanned the strip may be dyed with bromphenol blue, as described above so that the various constituents can be visibly detected.

The following are illustrative examples of analyzing procedures in accordance with the invention.

PROCEDURE NO. 1

*Step 1.*—Place a strip of absorbent paper or other carrier in known apparatus for separation of materials by electrophoresis, as shown diagrammatically in Fig. 1.

*Step 2.*—Fill vessels 20 and 21 with a conductive solution, such a buffer containing barbituric acid and sodium barbiturate having an ionic strength of .075 and a pH of about 8.6. The ends of the strip must extend into the liquid in the vessels and be moistened with the solution.

*Step 3.*—Apply the material such as whole blood, blood serum or other material, having charged particles that will migrate in an electric field, to the strip. This is normally done by applying a narrow strip of the material transversely of the strip and in about the center thereof.

*Step 4.*—Apply a direct current potential between the vessels to cause an electric current to flow through the strip. Continue the flow of electric current through the strip to effect the desired degree of separation. In the case of blood and blood serum, this is normally 12 to 15 hours.

*Step 5.*—Remove the strip from the electrophoresis apparatus and place while moistened with buffer on an insulated support.

*Step 6.*—Apply electric terminal to one end of strip and connect to an electric potential-indicating instrument such as a recorder having a sensitivity of the order of a few millivolts.

*Step 7.*—Connect a second movable electrode to the indicating instrument.

*Step 8.*—Move the movable electrode along the length of the strip while maintaining it in contact with the strip to produce a record of the potentials produced by the separated materials on the strip.

PROCEDURE NO. 2

In the case of proteins, upon completion of Step 6, strip may be dried and heated to denature the protein molecules. The strip is then moistened with the buffer solution or other conductive liquid and then Steps 7 and 8 are completed.

PROCEDURE NO. 3

*Step 1.*—Separate a material to be analyzed into at least certain of its component parts by applying the material to a carrier medium and effecting separation by electrophoresis or other separation process.

*Step 2.*—Connect a pair of electrodes to an indicating instrument having a sensitivity at least of the order of a few millivolts.

*Step 3.*—With the material on the carrier medium moistened with a conductive solution, place one electrode on the carrier and in contact with the conductive solution and move the other electrode over the carrier to successively contact the separated components of the material.

It has also been found that an electrophoretic strip such as the strip 10 can be covered with a thin vinyl or natural product membrane prior to the electrical scanning operation as described above and contactor 30 moved over the film to detect the varying potentials as described above and illustrated in Figure 5. Furthermore, the contactors 30a and 30b may be of any suitable conductive material, though metals such as gold, platinum and the like are generally preferred.

It is evident from the foregoing description that this invention overcomes the serious disadvantages of prior systems for analyzing the composition of materials separated by electrophoresis or other known processes, namely, the difficulty in treating and dyeing all records uniformly to enable optical analysis, the extended time required in preparing the record, and the limited resolution of optical systems which require highly experienced operating personnel. With the invention, a detailed graphic record can be made within minutes after the materials have been separated and with a resolution and accuracy far exceeding that attainable with optical systems. Furthermore, while paper electrophoretic records were selected for the purpose of illustrating and describing the invention, it is to be understood that separated materials in a saturated condition and carried by any suitable supporting medium may be electrically scanned and analyzed by the method and apparatus in accordance with the invention.

While only certain forms of the invention have been illustrated and described, it is understood that modifications, alterations and changes may be made without departing from the true scope and spirit thereof.

What is claimed is:

1. The method of analyzing a material on a carrier and which material contains at least one constituent comprising the steps of treating the material with a conductive solution, placing at least one electrode in contact with said solution treated material, placing at least one additional electrode in electrolytic circuit with said treated material, moving at least said one electrode relative to the carrier and in contact with the material and indicating the voltage generated between said electrodes while moving said one electrode.

2. The method of analyzing the extent of migration and concentration of particles on a carrier and produced by electrophoresis of a material comprising the steps of treating the material with a conductive solution, placing at least one electrode in contact with said solution treated material, placing at least one other electrode in electrolytic circuit with said treated material, moving at least said one electrode relative to the carrier and in contact with the material and indicating the voltage generated between the electrodes while moving said one electrode.

3. The method according to claim 2 including the step of fixing said other electrode to the carrier and in contact with the conductive solution.

4. The method of detecting the concentration of particles of material on a carrier treated with a conductive solution comprising the steps of placing at least one electrode in contact with said solution treated material, placing at least one other electrode in electrolytic circuit with said treated material, moving at least said one electrode relative to the carrier and in contact with the material and indicating the voltage generated between the electrodes while moving said one electrode.

5. The method of detecting a material carried by a supporting medium and including a conductive solution comprising the steps of placing at least one electrode in contact with said material and conductive solution, placing at least one other electrode in electrolytic circuit with said treated material, moving at least said one electrode over the carrier and in contact with the material and indicating the voltage generated between the electrodes while moving said one electrode.

6. The method of analyzing materials formed of particles that will migrate in an electric field such as blood, blood serum and the like comprising the steps of treating a carrier with a conductive solution, intermixing said material with said solution on said carrier to form a plurality of individual particles in said solution, applying a potential to said solution and between spaced points on said carrier to effect migration of said particles, removing said potential from said solution and then placing at least two electrodes in contact with said solution, moving at least one electrode relative to the carrier and in contact with said solution and said particles of material in said solution and indicating the voltage generated between the electrodes while moving said one electrode.

7. The method according to claim 6 wherein said carrier and said particles of material are dried upon removal of said potential and the carrier and particles of material are treated with a second conductive solution prior to the placement of said electrodes and indication of said voltage.

8. The method of analyzing proteins comprising the steps of treating a carrier with a conductive solution, applying said protein to said carrier and in contact with said solution, placing at least one electrode in contact with said solution treated proteins, placing at least one other electrode in electrolytic circuit with said treated material, moving at least said one electrode relative to the carrier and in contact with the material and indicating the voltage generated between the electrodes while moving said one electrode.

9. The method of analyzing proteins comprising the steps of treating a carrier with a conductive solution, applying said protein to said carrier and in contact with said solution, applying a potential to conductive solution and between spaced points on the carrier, removing said potential, placing at least two electrodes in contact with said solution, moving at least one electrode relative to the carrier and in contact with the material and indicating the voltage generated between the electrodes while moving said one electrode.

10. The method of analyzing proteins comprising the steps of treating a carrier with a conductive solution, applying said protein to said carrier and placing it in solution with the conductive solution, applying a potential to conductive solution and between spaced points on the carrier, removing said potential, drying said carrier and protein to denature said protein, treating the carrier and denatured protein with a second conductive solution, placing at least two electrodes in contact with said second solution, moving at least one electrode relative to the carrier and in contact with the material and indicating the voltage generated between the electrodes while moving said one electrode.

11. The method according to claim 10 wherein at least one of said conductive solutions is a buffer containing barbituric acid and sodium barbiturate.

12. The method according to claim 10 wherein at least one of said conductive solutions is a sodium phosphate-saline buffer.

13. The method according to claim 10 wherein said carrier is a strip of absorbent material.

14. The method of analyzing a material containing at least one constituent on a carrier comprising the steps of treating the material and said carrier with a conductive solution, placing electrodes in contact with said solution, and then measuring the voltage produced by said electrodes and said solution between points on the carrier.

15. The method of analyzing a material containing at least one constituent comprising the steps of combining a conductive solution with said material, forming a first half cell by placing an electrode in a conductive solution with the latter electrolytically coupled with the first said solution, placing at least one electrode in contact with said material in combination with the first said solution and measuring the voltage between said electrodes.

16. The method according to claim 15 wherein said material is supported by the carrier and said conductive solutions are identical and in contact one with the other on said carrier.

17. The method of analyzing a material containing at least one constituent comprising the steps of heating said material with a conductive solution, placing at least one electrode in electrolytic circuit with said treated material, placing a second electrode in contact with said treated material and measuring the voltage generated between said electrodes.

References Cited in the file of this patent

UNITED STATES PATENTS

| | | |
|---|---|---|
| 2,063,992 | Elsey | Dec. 15, 1936 |
| 2,192,404 | Jakosky | Mar. 5, 1940 |
| 2,215,213 | Ellis | Sept. 17, 1940 |
| 2,288,180 | Brengman et al. | June 30, 1942 |
| 2,316,340 | Kohn | Apr. 13, 1943 |
| 2,843,540 | Ressler | July 15, 1958 |